Dec. 3, 1946.  E. McDERMOTT  2,412,165
SUBMARINE DETECTING METHOD AND APPARATUS
Filed March 7, 1942  2 Sheets-Sheet 1

INVENTOR
Eugene McDermott
BY
Sawyer, Kennedy, Harrison & Hayrell
ATTORNEYS

Dec. 3, 1946.  E. McDERMOTT  2,412,165
SUBMARINE DETECTING METHOD AND APPARATUS
Filed March 7, 1942   2 Sheets-Sheet 2
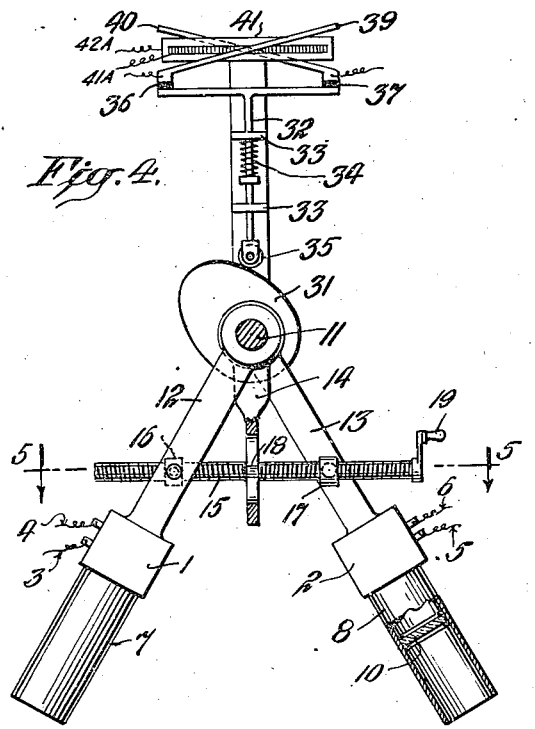
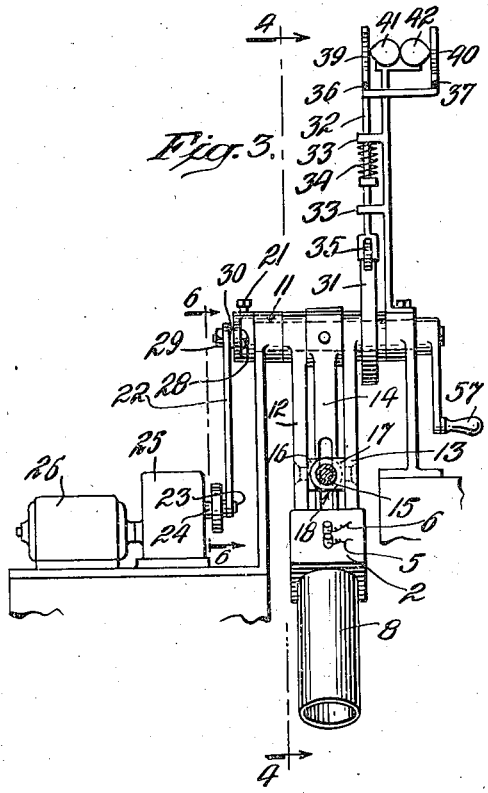
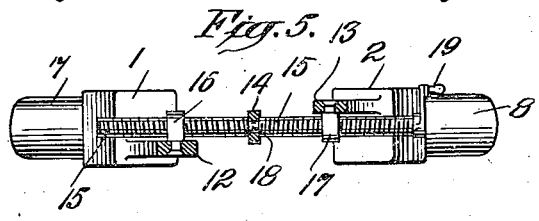
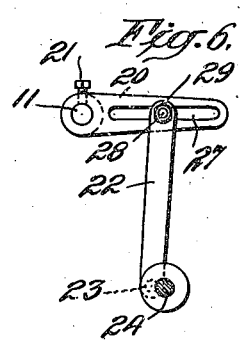
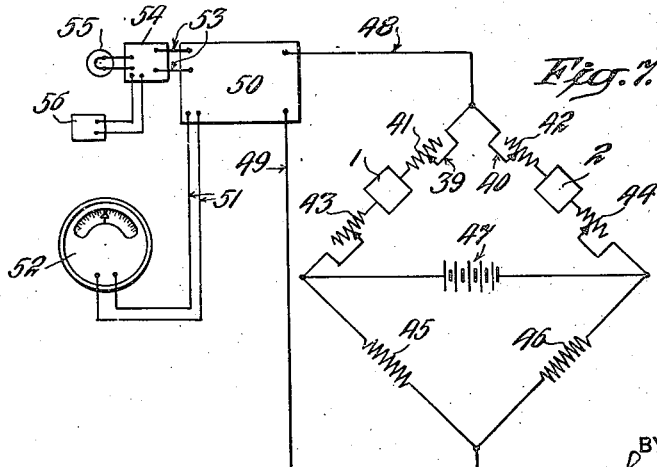
INVENTOR
Eugene McDermott
BY
Sawyer, Kennedy, Hanson & Hazell
ATTORNEYS Patented Dec. 3, 1946

2,412,165

UNITED STATES PATENT OFFICE 2,412,165

SUBMARINE DETECTING METHOD AND APPARATUS

Eugene McDermott, Dallas County, Tex.

Application March 7, 1942, Serial No. 433,836

4 Claims. (Cl. 250—83.3)

This invention relates to heat detecting methods and apparatus, and more particularly to a method and mechanism for detecting relatively warm surface areas or objects from aircraft.

It is an object of the invention to provide a method of detecting the presence of ships, and more particularly submarines, by detecting the slightly heated wake created by such vessels.

A further object of the invention is to provide an improved method and apparatus for detecting such heated areas, or other heated areas, from aircraft.

With these objects, and still others which will appear in the course of the following full description in mind, the invention consists in the novel methods, combinations and arrangements of parts and details of construction which will now first be fully described in connection with the accompanying drawings and then pointed out more particularly in the appended claims.

In the drawings:

Fig. 3 is a side elevation of a heat detecting device embodying the invention in a preferred form;

Fig. 4 is a vertical section taken on the line 4—4 of Fig. 3;

Fig. 5 is a horizontal section taken on the line 5—5 of Fig. 4.

Fig. 6 is a vertical section taken on the line 6—6 of Fig. 3; and

Fig. 7 is a schematic view and circuit diagram of indicating apparatus used in conjunction with the device of Figs. 3 to 6.

Figure 1:
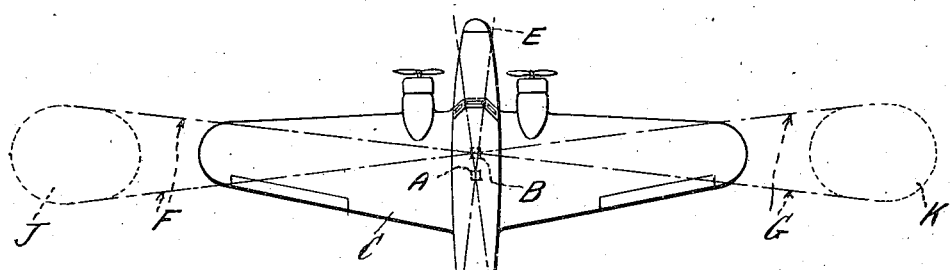
Figs. 1 and 2 are, respectively, a schematic plan view and side elevation of an airplane, indicating the scanning method employed in detecting heated water areas.
Figure 2:
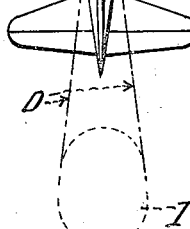
Figure 2:
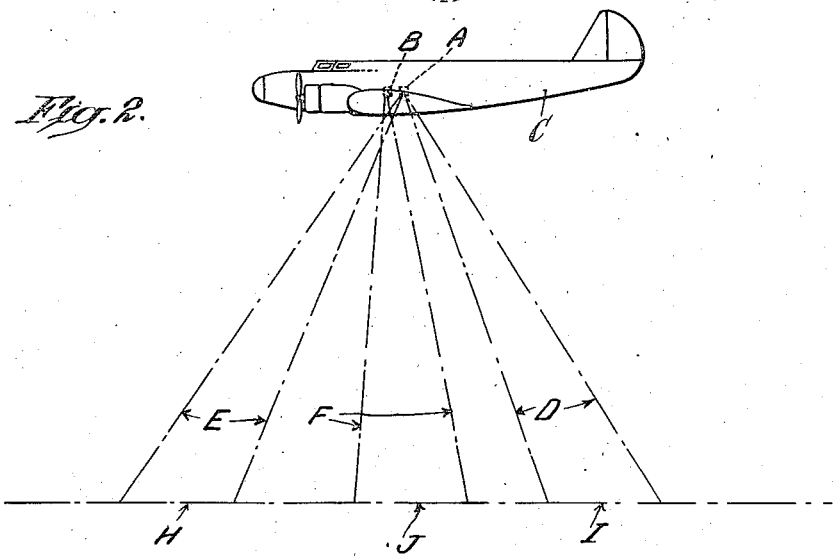

Referring now to Figs. 1 and 2, the invention contemplates the use of thermoresponsive devices A and B, mounted in an aircraft C, in any convenient location, and adapted to register heat conditions of a surface below. Device A will preferably scan or register heat conditions in so much of an area as falls within the rearward and forward conical fields of view D and E, while device B will scan areas falling within similar lateral fields of view F and G.

The thermoresponsive devices A and B are fairly directional. That is to say, no attempt is made to bring an object to focus upon a thermosensitive element and in this way to measure or attempt to measure its temperature, as has been done or attempted in certain prior proposals. According to the present invention, thermosensitive elements are used to indicate the presence of comparatively large areas having a temperature different from surrounding areas. Typical of such areas is the "heat track," as it may be called, which is necessarily left in the wake of any vessel and particularly of a submarine when submerged. While the temperature difference is necessarily small, the area falling within the "field of view" of the thermosensitive devices may be made relatively quite large, of the order of a hundred feet in diameter, thus furnishing a reliable indication of heat differences.

In practice, an airplane C will patrol a given area of water, the thermoresponsive devices A and B being rocked or oscillated fore and aft and laterally, respectively, so as to sweep or scan the complete area being patrolled. Oscillation of device A, combined with the motion of the airplane, results in the scanning of an area or strip producing wide coverage without sacrifice of sensitivity. The elements registering the temperature conditions within fields of view E and D will preferably be differentially connected so that a difference in temperature of the water between the areas H and I will be indicated, while constant temperature conditions as between these two areas will not affect the readings. Similarly, the elements which register the temperature conditions within the fields F and G, or the surface areas J and K, will be differentially connected so that they remain unaffected except by changes in the relative temperatures of these areas. The areas scanned, as devices A and B are oscillated, will necessarily vary and accordingly the oscillation of the devices A and B will in itself tend to produce changes in the readings or indications obtained. This factor may be cancelled out in various ways as, for example, by automatically varying the width of the field of view as the device A or B oscillates. An electrical mechanism for accomplishing this result is described below. A more specific description of various features of the method of detecting heated areas will be found in the following description of a suitable mechanism for use in practicing the method of the invention.

Referring now to Figs. 3 to 6, there is illustrated in diagrammatic form a mechanism which is suitable for use as either one of the heat responsive devices A or B referred to. Such a device includes a pair of heat sensitive elements such as thermocouples or bolometers 1 and 2 provided with connecting leads 3, 4, 5 and 6, and fitted with suitable optical apparatus including hoods 7 and 8 for shutting out stray or undesired radiations and lens and filter elements 10 as indicated diagrammatically in the broken away portion of hood 8. Filter elements are preferably employed which will cut out the entire visible and higher range of the spectrum, or substantially the entire visible range, permitting only the infra-red or heat rays to affect the thermocouples or other thermosensitive elements. The elements 1 and 2 are mounted swingingly about a shaft 11 by means of arms 12 and 13 and are held in fixed position relative to the shaft by means of a centrally located member 14 to which they are connected by means of a right and left threaded screw 15, which passes through nuts 16 and 17 pivotally mounted on the respective arms 12 and 13 and also through a bushing or bearing 18 upon the member 14. Screw 15 is provided with a handle 19, by turning which the angle between arms 12 and 13 may be varied while keeping them at all times symmetrical about the central member 14. The shaft 11 is oscillated by means of a crank arm 20, fastened thereto by a set screw 21, and connected by a rod 22 to crank pin 23 which in turn is rotated by a shaft 24. Shaft 24, through reduction gear box 25, is driven by an electric motor 26. Variation in the extent of oscillation of shaft 11 is provided for by means of slot 27 in arm 20 and bolt 28 passing therethrough and fixable at any position therealong by means of nut 29, the latter being provided with the usual neck 30 passing through rod 22 and serving as a pivotal bearing for the rod 22.

Means is provided for compensating for the variation in area viewed during oscillation, referred to above, and includes a cam 31 fixed to the shaft 11 and a cam rod 32 slidably mounted in brackets 33 and urged downwardly by a spring 34 so as to press roller 35 at its lower end against the surface of cam 31. Mounted at the upper end of rod 32 and electrically insulated therefrom, as by means of insulating blocks 36 and 37, are a pair of rheostat control arms 39 and 40 operating on the rheostat resistance elements 41 and 42. The rheostat elements are connected so that an upward movement of the cam rod 32 decreases the resistance of the one rheostat and increases that of the other, whereas a downward movement has the opposite effect. The connections for the resistance elements 41 and 42 are respectively indicated by the reference numerals 41A and 42A. Referring now to the circuit diagram of Fig. 7, showing a differential connection for the thermosensitive elements 1 and 2, these elements are connected in series with the rheostats 39, 41 and 40, 42, previously referred to, in respective sides of a bridge circuit including also trimming rheostats 43 and 44 as shown. As will be understood, the trimming rheostats are necessary merely for compensation for different circuit characteristics of the elements. The bridge circuit includes resistors 45 and 46 in its opposite arms, the usual source of current 47, and leads 48 and 49 in the control circuit, which terminate in an amplifier 50. As will be understood, the bridge circuit shown is suitable for use with thermosensitive elements of resistance-variation type, and is merely illustrative. Any suitable one of the conventional differential circuits may be employed, the specific differential circuit, old in itself, forming no part of the present invention.

Amplifier 50 is provided with outputs connected through conductors 51 to an electrical meter of the ordinary dial type, 52, and also through conductors 53 to a relay 54 which is adapted to operate a light signal 55 and bell 56. Here again, the specific type of amplifier 50 and meter 52 employed form no part of the present invention. One suitable combination is the well known vacuum tube voltmeter direct current amplifying arrangement, with its characteristic stability and linearity of calibration.

The various elements referred to will preferably be arranged so as to center the pointer of the meter 52 when the electrical conditions of the bridge are balanced so that it swings to either side, depending upon which of thermosensitive devices 1 and 2 has the lower resistance. As will be understood, the elements are similarly arranged so that relay 54 will operate the visual signal and bell upon any condition of unbalance exceeding a threshold which is set so as to avoid indication of minor transient temperature variations.

Cam 31 is arranged so that the extreme limits of oscillation of shaft 11 will bring its high point and low point respectively under the roller 35, this roller being in mid position when the arms 12 and 13 are symmetrical about the vertical. The curve of the surface of cam 31 is arranged with relation to the characteristics of rheostats 41 and 42 so that an automatic compensation for the effect of varying field of view of the thermocouples 1 and 2, due to oscillation of shaft 11, is obtained. Such compensation will vary with service conditions and particularly with the height of an airplane over the water surface and may readily be provided for by utilizing interchangeable cams having suitably shaped surfaces.

Considering now, for example, the device of Fig. 4 to be mounted in an airplane with the shaft 11 running crosswise so that the oscillation is fore and aft, no unbalance will be created in the bridge circuit sufficient to operate the light and bell signals so long as the temperature conditions of the water below are normal. As soon, however, as the field of view of thermocouple 1 or 2 crosses the slightly warm wake or "heat track" of a vessel such as a submerged submarine, a condition of unbalance will be created, causing the signals 55 and 56 to operate and permitting the determination of its direction and intensity by means of meter 52. At the same time, the similar device B mounted with its shaft 11 running fore and aft and fields of view oscillating from side to side, will furnish a further indication. These two indications may be used to estimate with considerable accuracy the position of the heat track causing them and a more precise location may be computed by scanning the approximate location at a lower altitude or speed, or both. Particularly for the latter purpose, a slow, manual oscillation may be desirable, and accordingly the devices are provided with means such as handles 57 (Fig. 3) keyed to the shafts 11 to permit oscillation by hand instead of through the electric motors 26.

As will be apparent, devices A and B, each of which employs only a single thermocouple or other heat sensitive device may be used, but in this event the same sensitivity and freedom from the effects of insignificant transient local temperature changes cannot be expected. It is also possible, in some cases, to employ fixed thermoresponsive devices, utilizing the motion of the aircraft to obtain a scanning effect. Further a single device A or B may be employed, but again with a sacrifice of the full benefit of the invention. As will also be apparent, the device and method of the invention may be utilized for locating relatively large land areas or objects such as factories, where there is a significant temperature difference between the same and the surrounding terrain and may, in fact, be utilized for the direction of bombs or depth charges under conditions where visual sighting is impossible. It may also be used for locating coast lines.

An important advantage of the present invention over previous proposals arises from the employment of heat responsive and fairly directional detector elements differentially connected, resulting in comparative freedom from disturbance by reflected radiations. Such disturbance by reflected radiations may of course result from differing reflective power of various water areas, due to waves or ripples caused by wind, or may be caused by variation due to changes in incident sunlight caused by cloud shadows or the like. In this connection, it will also be recalled that heat radiations, being of greater wave length, are much less subject to variation in intensity due to atmospheric conditions than are the shorter radiations of the visible spectrum. By differentially connecting the detector elements changes in atmospheric conditions, such as temperature changes, do not affect the operation of the device.

What is claimed is:

1. The method of locating a submarine from aircraft which comprises traversing an area to be patrolled and scanning the surface thereof with fairly directional heat detectors, substantially insensitive to light waves within the visible and higher portions of the spectrum, one of the said detectors being oscillated fore and aft and another of the said detectors being oscillated laterally to scan two strips of said surface, and locating thereby the heat track of a submarine.

2. A heat detector for locating surface objects and areas from aircraft comprising in combination two fairly directional thermosensitive elements disposed at an angle to scan separate areas, means for oscillating said elements as a unit, and a differential indicator circuit for registering relative variations in temperature between the areas scanned by the said elements.

3. A heat detector according to claim 2, comprising also compensating means for eliminating variations upon said thermosensitive elements due to oscillation thereof by said oscillating means.

4. A heat detector according to claim 2, comprising also compensating means for eliminating variations upon said thermosensitive elements due to oscillation thereof by said oscillating means, said compensating means including variable resistance elements in said differential circuit and means operable by said oscillating means to vary the resistance of said variable resistance elements.

EUGENE McDERMOTT.